United States Patent
Uchida

(10) Patent No.: US 8,718,970 B2
(45) Date of Patent: May 6, 2014

(54) METHOD OF ESTIMATING STRIDE LENGTH, METHOD OF CALCULATING MOVEMENT TRAJECTORY, AND STRIDE LENGTH ESTIMATING DEVICE

(75) Inventor: Shuji Uchida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 367 days.

(21) Appl. No.: 13/009,799

(22) Filed: Jan. 19, 2011

(65) Prior Publication Data

US 2011/0178759 A1    Jul. 21, 2011

(30) Foreign Application Priority Data

Jan. 19, 2010    (JP) .................................. 2010-008809

(51) Int. Cl.
*G01P 15/00* (2006.01)

(52) U.S. Cl.
USPC ...................................................... 702/141

(58) Field of Classification Search
USPC .............. 702/75, 85, 141, 142, 151, 158, 160
See application file for complete search history.

(56) References Cited

U.S. PATENT DOCUMENTS

| | | | |
|---|---|---|---|
| 5,583,776 A * | 12/1996 | Levi et al. ..................... | 701/400 |
| 6,145,389 A * | 11/2000 | Ebeling et al. ............... | 73/865.4 |
| 2003/0018430 A1* | 1/2003 | Ladetto et al. ................ | 701/217 |
| 2004/0230138 A1* | 11/2004 | Inoue et al. ................... | 600/595 |
| 2007/0073514 A1* | 3/2007 | Nogimori et al. ............. | 702/160 |
| 2008/0284650 A1* | 11/2008 | MacIntosh et al. ...... | 342/357.14 |

FOREIGN PATENT DOCUMENTS

| | | |
|---|---|---|
| JP | 09-152355 A | 6/1997 |
| JP | 3834855 B2 | 10/2006 |

* cited by examiner

*Primary Examiner* — Mohamed Charioui
(74) *Attorney, Agent, or Firm* — Kilpatrick Townsend & Stockton LLP

(57) ABSTRACT

A method of estimating a stride length includes: detecting acceleration of a user's vertical movement; and estimating a stride length using the detected acceleration by changing the degree of correlation between the acceleration and the stride length, in which the stride length is increased as the detected acceleration increases, based on user's speed.

6 Claims, 12 Drawing Sheets

604

| WALKING SPEED RANGE | STRIDE LENGTH ESTIMATING MODELING EQUATION |
|---|---|
| LOW SPEED | $y = a_1 x + b_1$ |
| INTERMEDIATE SPEED | $y = a_2 x + b_2$ |
| HIGH SPEED | $y = a_3 x + b_3$ |

| DETECTION TIME | ACCELERATION | ANGULAR VELOCITY |
|---|---|---|
| t1 | (Ax1,Ay1,Az1) | (ωx1,ωy1,ωz1) |
| t2 | (Ax2,Ay2,Az2) | (ωx2,ωy2,ωz2) |
| t3 | (Ax3,Ay3,Az3) | (ωx3,ωy3,ωz3) |
| ⋮ | ⋮ | ⋮ |

NEW ↑ / OLD ↓

FIG.12

| OUTPUT TIME | POSITION | WALKING SPEED | WALKING DIRECTION | RELATIVE/ ABSOLUTE TYPE |
|---|---|---|---|---|
| T1 | (X1,Y1) | V1 | θ1 | ABSOLUTE |
| T2 | (X2,Y2) | V2 | θ2 | RELATIVE |
| T3 | (X3,Y3) | V3 | θ3 | RELATIVE |
| ... | ... | ... | ... | ... |

FIG. 13

METHOD OF ESTIMATING STRIDE LENGTH, METHOD OF CALCULATING MOVEMENT TRAJECTORY, AND STRIDE LENGTH ESTIMATING DEVICE

BACKGROUND

1. Technical Field

The present invention relates to a method of estimating a stride length, a method of calculating a movement trajectory, and a stride length estimating device.

2. Related Art

As a stride length estimating device that estimates a user's stride length, a device that has an acceleration sensor and estimates a stride length based on a temporal change in the acceleration detected by the acceleration sensor by referring to a predetermined table is known (for example, JP-A-9-152355).

A user's stride length is essential information required for calculating a walking distance or calculating a user's movement trajectory by calculating the user's current position. Accordingly, it is necessary to estimate the user's stride length as accurately as possible. However, the stride length changes in accordance with factors such as a user's physical attributes and gait. Thus, according to the technology disclosed in JP-A-9-152355 in which the stride length is estimated by using a fixed table, there is a problem in that the stride length cannot be estimated accurately.

SUMMARY

An advantage of some aspects of the invention is to provide a new technique for estimating a stride length more accurately.

According to a first aspect of the invention, there is provided a method of estimating a stride length. The method includes: detecting acceleration of a user's vertical movement; and estimating a stride length using the detected acceleration by changing the degree of correlation between the acceleration and the stride length, in which the stride length is increased as the detected acceleration increases, based on user's speed.

In addition, as another aspect, there may be configured a stride length estimating device including: an acceleration detecting unit that detects acceleration of a user's vertical movement; and a stride length estimating unit that estimates a stride length using the detected acceleration by changing the degree of correlation between the acceleration and the stride length, in which, as the acceleration detected by the acceleration detecting unit increases, the stride length is increased, based on user's speed.

According to the first aspect and the like, a stride length is estimated using the detected acceleration by changing the degree of correlation between the acceleration and the stride length, in which, as the acceleration of the user's vertical movement increases, the stride length is increased, based on user's speed. As a result of an experiment, it could be understood that there is positive correlation between the acceleration of a user's vertical movement and the user's stride length, which will be described in detail later. In addition, it could be understood that the rate of change in the stride length with respect to change in the acceleration changes in accordance with the user's speed. Accordingly, by changing the degree of the correlation between the acceleration and the stride length based on the user's speed, the user's stride length can be estimated more accurately.

In addition, as a second aspect, in the method of estimating a stride length according to the first aspect, changing the degree of correlation such that, as the user's speed increases, a rate of change in the stride length with respect to change in the acceleration decreases may be included.

According to the second aspect, by changing the degree of correlation such that, as the user's speed increases, a rate of change in the stride length with respect to change in the acceleration decreases, appropriate estimation of a stride length according to the user's speed can be realized.

In addition, as a third aspect, in the method of estimating a stride length according to the first or second aspect, the estimating of a stride length may be estimating a stride length by using a correlation modeling equation between the acceleration and the stride length using the degree of the correlation.

According to the third aspect, by using the correlation modeling equation between the acceleration of the user's vertical movement and the stride length, a stride length can be calculated simply and easily.

In addition, as a fourth aspect, the method of estimating a stride length according to any one of the first to third aspects may further include extracting a low frequency component from the detected acceleration, wherein the estimating of a stride length is estimating a stride length using the acceleration of the extracted low frequency component.

According to the fourth aspect, a low frequency component is extracted from the detected acceleration of the user's vertical movement, and a stride length is estimated by using the acceleration of the extracted low frequency component. In the acceleration of the user's vertical movement, a noise component having a high frequency is included. Accordingly, by extracting a low frequency component from the acceleration of the user's vertical movement and estimating a stride length using the corresponding acceleration, the accuracy in estimation of the stride length can be improved.

In addition, as a fifth aspect, in the method of estimating a stride length according to the fourth aspect, a frequency band to be extracted may be changed in accordance with the user's speed.

According to the fifth aspect, by changing the frequency band to be extracted from the acceleration of the user's vertical movement in accordance with the user's speed, the accuracy in estimation of a stride length can be further improved.

According to a sixth aspect of the invention, there is provided a method of calculating a movement trajectory. The method includes: estimating a user's stride length by using the method of estimating a stride length according to any one of the first to fifth aspects; estimating a user's walking direction by using a gyro sensor; and calculating a user's movement trajectory by using the estimated stride length and the estimated walking direction.

According to the sixth aspect, a user's walking direction is estimated by using a gyro sensor, and a user's movement trajectory is calculated by using the estimated stride length and the estimated walking direction. By using the stride length estimated by using the method of estimating a stride length according to the above-described aspect and the walking direction estimated by using the gyro sensor, a user's movement trajectory can be appropriately acquired.

In addition, as a seventh aspect, in the method of estimating a movement trajectory according to the sixth aspect, the estimating of a walking direction may include: extracting a low frequency component from a detection result of the gyro sensor; changing a frequency band to be extracted in accordance with user's speed; and estimating the walking direction using a detection result of the extracted low frequency component of the gyro sensor.

According to the seventh aspect, a low frequency component is extracted from a detection result of the gyro sensor, and the frequency band to be extracted is changed in accordance with the user's speed. Then, a user's walking direction is estimated by using the detection result of the extracted low frequency component of the gyro sensor. Similarly to the acceleration of the user's vertical movement, a noise component having a high frequency is also included in the detection result of the gyro sensor. Accordingly, by extracting a low frequency component from the detection result, a user's walking direction can be estimated more accurately.

BRIEF DESCRIPTION OF THE DRAWINGS

The invention will be described with reference to the accompanying drawings, wherein like numbers reference like elements.

FIG. 11 is a diagram showing an example of the data configuration of correlation modeling equation data.

FIG. 12 is a diagram showing an example of the data configuration of sensor data.

FIG. 13 is a diagram showing an example of the data configuration of movement trajectory data.

DESCRIPTION OF EXEMPLARY EMBODIMENTS

Hereinafter, a removable navigation apparatus according to an embodiment of the invention as one type of an electronic apparatus including a stride length estimating device and a movement trajectory calculating device will be described with reference to the accompanying drawings. However, embodiments to which the invention can be applied are not limited to the embodiments described below.

1. Schematic Configuration

Figure 1:
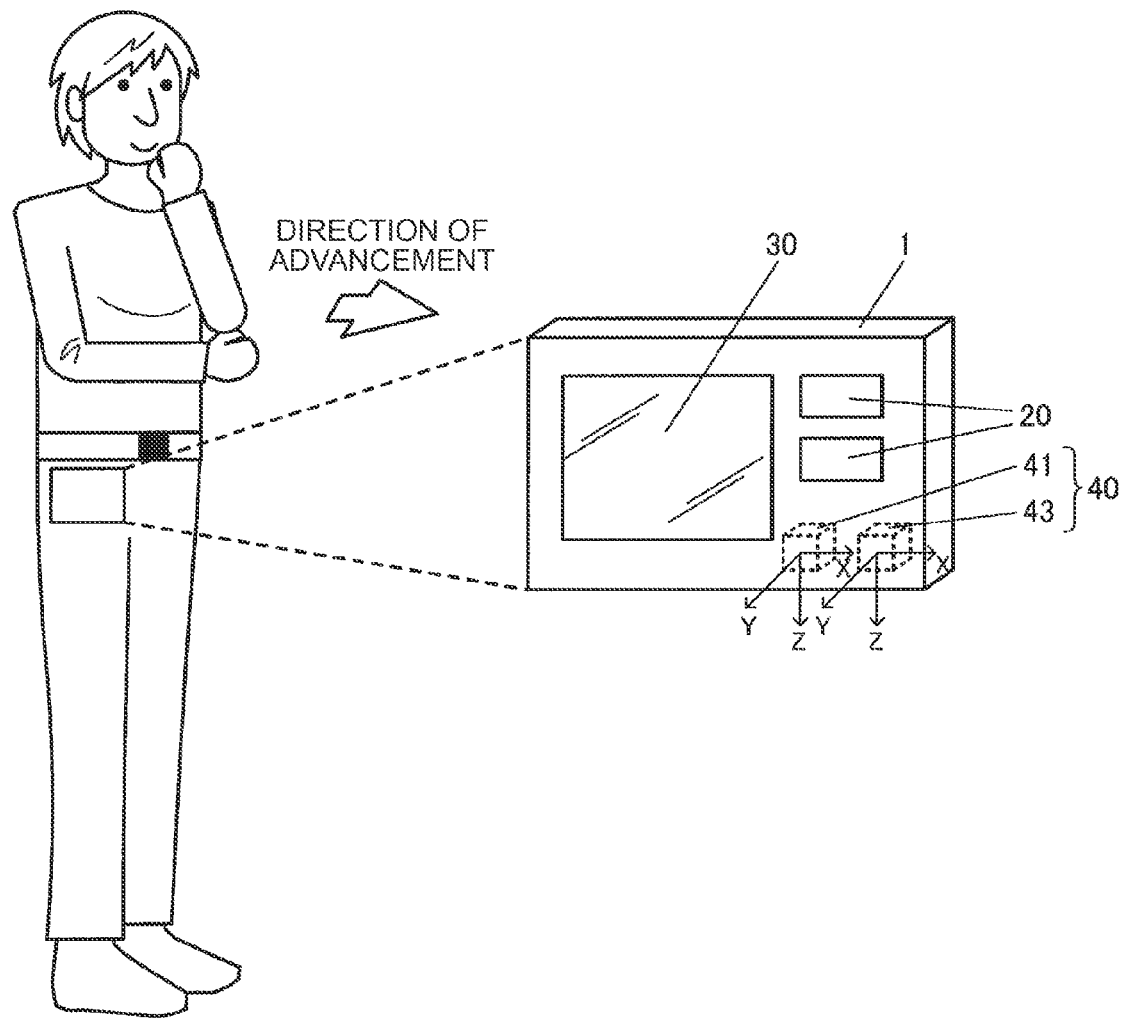
FIG. 1 is a schematic configuration diagram of a navigation apparatus.

FIG. 1 is an explanatory diagram showing the state of equipping a removable navigation apparatus 1 according to this embodiment to a user as a pedestrian and a schematic configuration of the navigation apparatus 1. The navigation apparatus 1 is an electronic apparatus having functions for estimating the stride length of a user as a pedestrian, estimating the movement direction of the user, calculating a user's movement trajectory, and the like in accordance with an instruction operation transmitted from an operation unit 20. For example, the navigation apparatus 1, as shown in FIG. 1, is used while being equipped to a user's waist on the right-hand side.

The navigation apparatus 1 includes a sensor unit 40 that has an acceleration sensor 41 and a gyro sensor 43. The navigation apparatus 1 detects the user's stride based on the acceleration detected by the acceleration sensor 41 and estimates a stride length based on a modeling equation that represents the correlation between the acceleration and the stride length. In addition, the navigation apparatus 1 estimates the user's movement direction based on the angular velocity detected by the gyro sensor 43. Then, the navigation apparatus 1 calculates the user's movement trajectory by sequentially calculating the user's location using the estimated stride length and the estimated movement direction and displays the user's movement trajectory in a display unit 30.

The acceleration sensor 41 is a sensor that detects the acceleration in three orthogonal axes. The acceleration sensor 41 may be any one of a strain gauge type or a piezoelectric type. In addition, the acceleration sensor 41 may be an MEMS (Micro Electro Mechanical Systems) sensor. The gyro sensor 43 is a sensor that detects the angular velocity in three orthogonal axes and is set to be disposed such that the axial direction is the same as that of the acceleration sensor 41. In FIG. 1, although the acceleration sensor 41 and the gyro sensor 43 are represented as independent sensors, the acceleration sensor 41 and the gyro sensor 43 may be an integrated sensor.

This embodiment will be described in a coordinate system of three orthogonal axes in which, when viewed from a user's perspective, the forward direction of the front-to-rear and rear-to-front directions is the "positive direction of the X axis", the rightward direction of the left-to-right and right-to-left directions is the "positive direction of the Y axis", and the downward direction of the upper-to-lower and lower-to-upper directions (the vertical direction) is the "positive direction of the Z axis". In addition, for easy understanding of the description, the axis directions of the detection axes of the acceleration sensor 41 and the gyro sensor 43 and the positive directions of the axes are described as being the same as the axis directions of the X axis, the Y axis, and the Z axis and the positive directions thereof. However, it is evident that actually there may be differences therebetween. The relative relationship between the detection axes of the acceleration sensor 41 and the gyro sensor 43 and the axis directions of the X axis, the Y-axis, and the Z axis is fixed to the user, the values of X, Y, and Z can be calculated through matrix calculation based on the detection results acquired by the acceleration sensor 41 and the gyro sensor 43.

2. Principles 2-1. Principle of Detection of Number of Steps

First, the principle of detecting the number of steps according to this embodiment will be described. The number of steps is detected based on the acceleration along the Z axis, which is the acceleration in a user's vertical movement, out of the acceleration along three orthogonal axes that is detected by the acceleration sensor 41.

More specifically, at time when the acceleration becomes a peak (a maximum value) in the time series variation in the acceleration along the Z axis, the user is determined to have taken by one step, and one step is counted. However, in the acquired acceleration along the Z axis that is detected by the acceleration sensor 41, a high-frequency noise component is included. Accordingly, there is a problem in that the peak of the acceleration detected by being regarded as one step may not be a "real peak" but a "false peak", which is a simple noise component, leading to miscounting of the number of steps.

The noise included in the above-described acceleration along the Z axis is a high-frequency component. Thus, in this embodiment, by performing filter processing for the acceleration along the Z axis, a low-frequency component of the acceleration along the Z axis that is detected by the acceleration sensor 41 is extracted. More specifically, the frequency of steps (the number of steps per second) at the time of walking is about 5 [Hz] even when assumed to be high, and it can be stated as not becoming as much as 10 [Hz]. Accordingly, by cutting off a frequency component having a frequency that is higher than several Hz as a cut-off frequency (a predetermined threshold frequency), a low-frequency component of the acceleration, that is, a component of the acceleration at the time of walking is extracted. Then, the peak of the acceleration of the extracted low-frequency component is detected so as to be determined as one step. A time between the peak of a specific acceleration and the peak of the next acceleration is a "time needed for one step".

In addition, in this embodiment, the threshold frequency at the time of performing the above-described filter processing is set to be changed in accordance with the user's speed. As a result of an experiment performed by the inventor, it was found that the frequency component included in the acceleration along the Z axis differs in accordance with the user's speed. More specifically, as the user's speed increases, the amplitude of the acceleration along the Z axis increases, and accordingly, the period of vibration tends to decrease. In other words, as the user's speed increases, a high frequency component having a higher frequency tends to be included in the acceleration along the Z axis as noise. Thus, in this embodiment, as the user's speed increases, the filter processing is performed for the acceleration while the threshold frequency is set to be higher.

Figure 2:
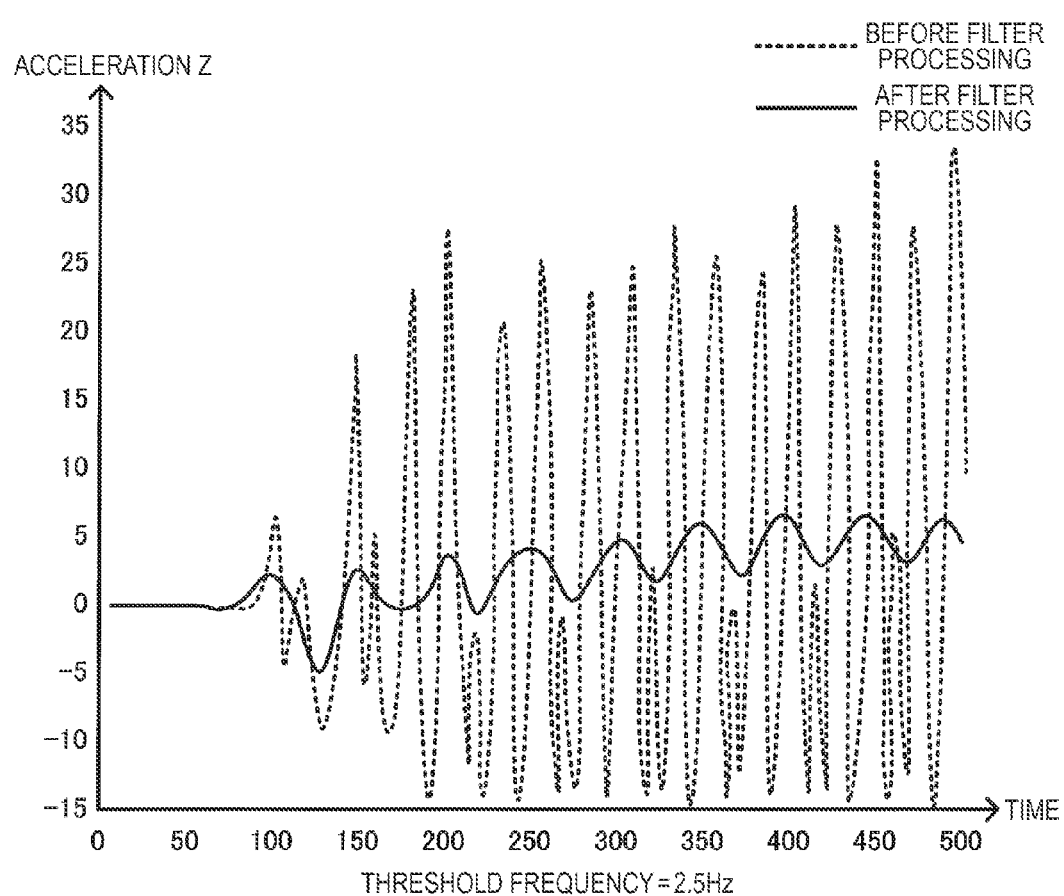
FIG. 2 is a diagram showing an example of a temporal change in the acceleration before and after filter processing.
Figure 3:
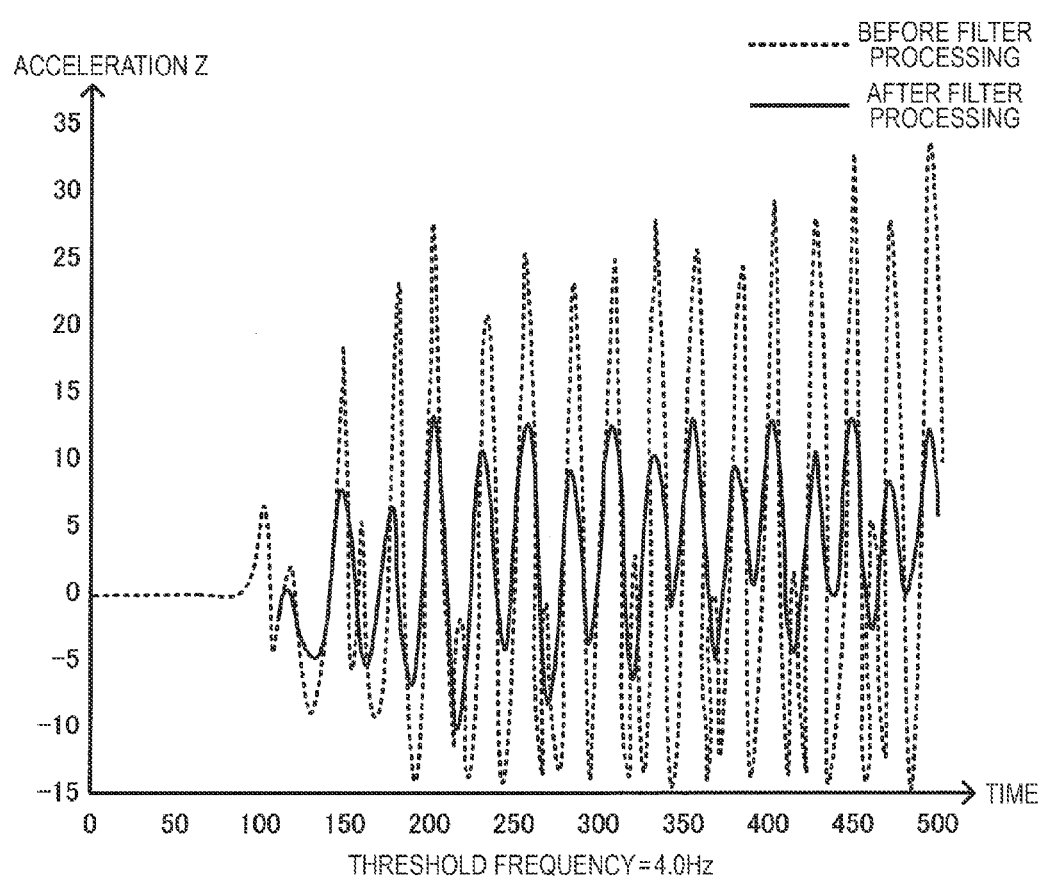
FIG. 3 is a diagram showing an example of a temporal change in the acceleration before and after filter processing.

FIGS. 2 and 3 are diagrams showing experiment results in which raw data of the acceleration along the Z axis and data after the filter processing is performed for the acceleration along the Z axis are compared with each other. The user's walking speed was set to "high speed", and an experiment was performed in which filter processing was performed for the acceleration along the Z axis actually detected by the acceleration sensor 41 while changing the threshold frequency. However, in this experiment, an appropriate value of the threshold frequency was 4.0 [Hz].

FIG. 2 is a diagram showing an experiment result in a case where filter processing was performed while the threshold frequency was set to 2.5 [Hz], which is lower than the appropriate value. FIG. 3 is a diagram showing an experiment result in a case where filter processing was performed while the threshold frequency was set to 4.0 [Hz], which is the appropriate value. In the figures, the horizontal axis represents the time, and the vertical axis represents the acceleration along the Z axis before and after the filter processing. Here, the acceleration before the filter processing is denoted by a broken line, and the acceleration after the filter processing is denoted by a solid line.

In any of the figures, it can be understood that, before the filter processing is performed, the acceleration along the Z axis includes a high-frequency component and finely vibrates with a large amplitude in the vertical direction. On the other hand, it can be understood that, after the filter processing is performed, the high-frequency component is eliminated from the acceleration along the Z axis, and the acceleration is smoothed.

In FIG. 2, the filter processing was performed while the threshold frequency was set to be lower than the appropriate value. Accordingly, the component of the acceleration at the time of high-speed walking was cut off more than necessary, and a result was acquired in which the number of peaks of the detected acceleration was deviated from the actual number of steps. On the other hand, in FIG. 3, the filter processing was performed while the threshold frequency was set to the appropriate value. Accordingly, the component of the acceleration at the time of high-speed walking was appropriately extracted, and a result was acquired in which the number of peaks of the detected acceleration coincides with the actual number of steps.

2-2. Principle of Estimating Stride Length

Next, the principle of estimating a stride length will be described. In this embodiment, the stride length is estimated based on a stride length estimating modeling equation that is predetermined as a modeling equation representing the correlation between the acceleration along the Z axis and stride length. The inventor found that there is correlation between the acceleration along the Z axis after the above-described filter processing and the user's stride length.

Figure 4:
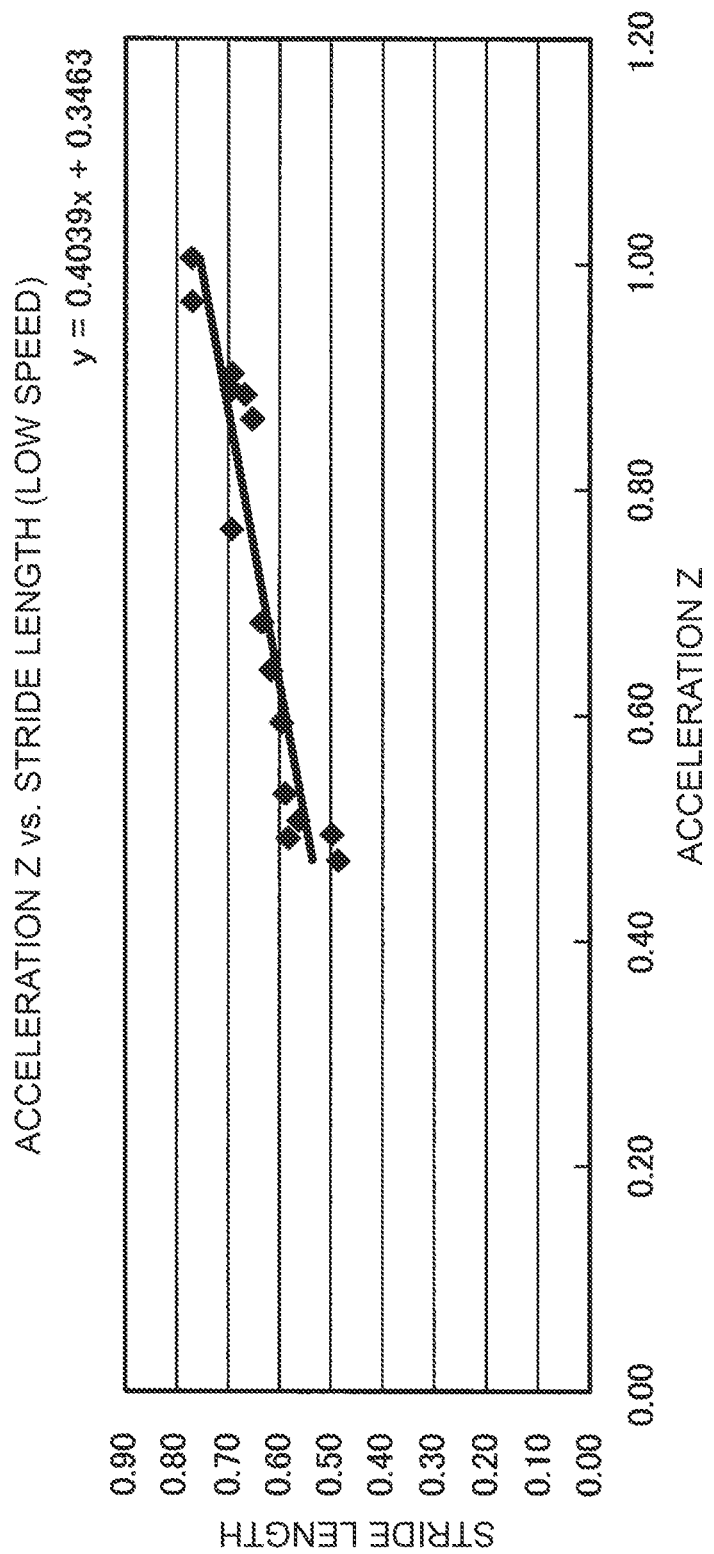
FIG. 4 is a diagram showing an example of the correspondence relationship between the acceleration and a stride length.
Figure 5:
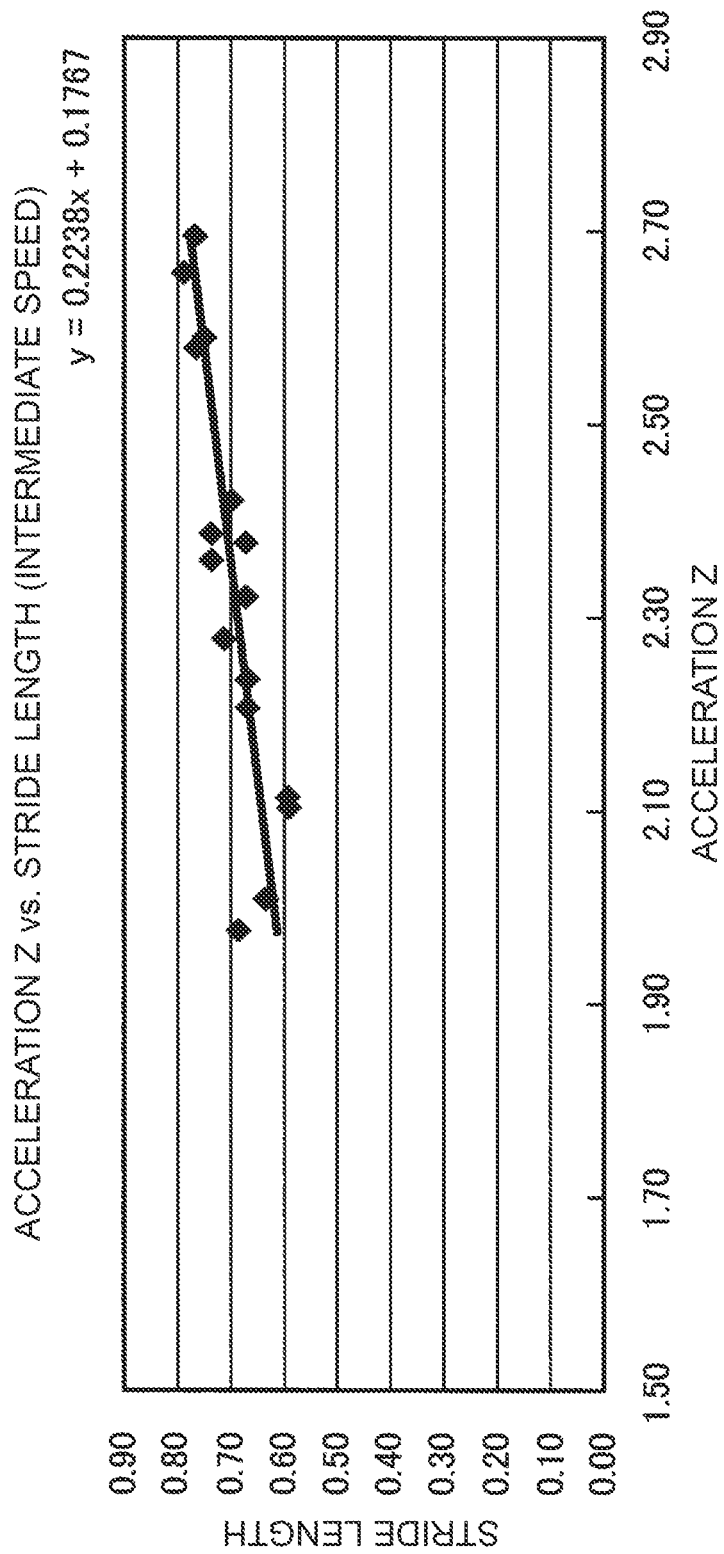
FIG. 5 is a diagram showing an example of the correspondence relationship between the acceleration and the stride length.
Figure 6:
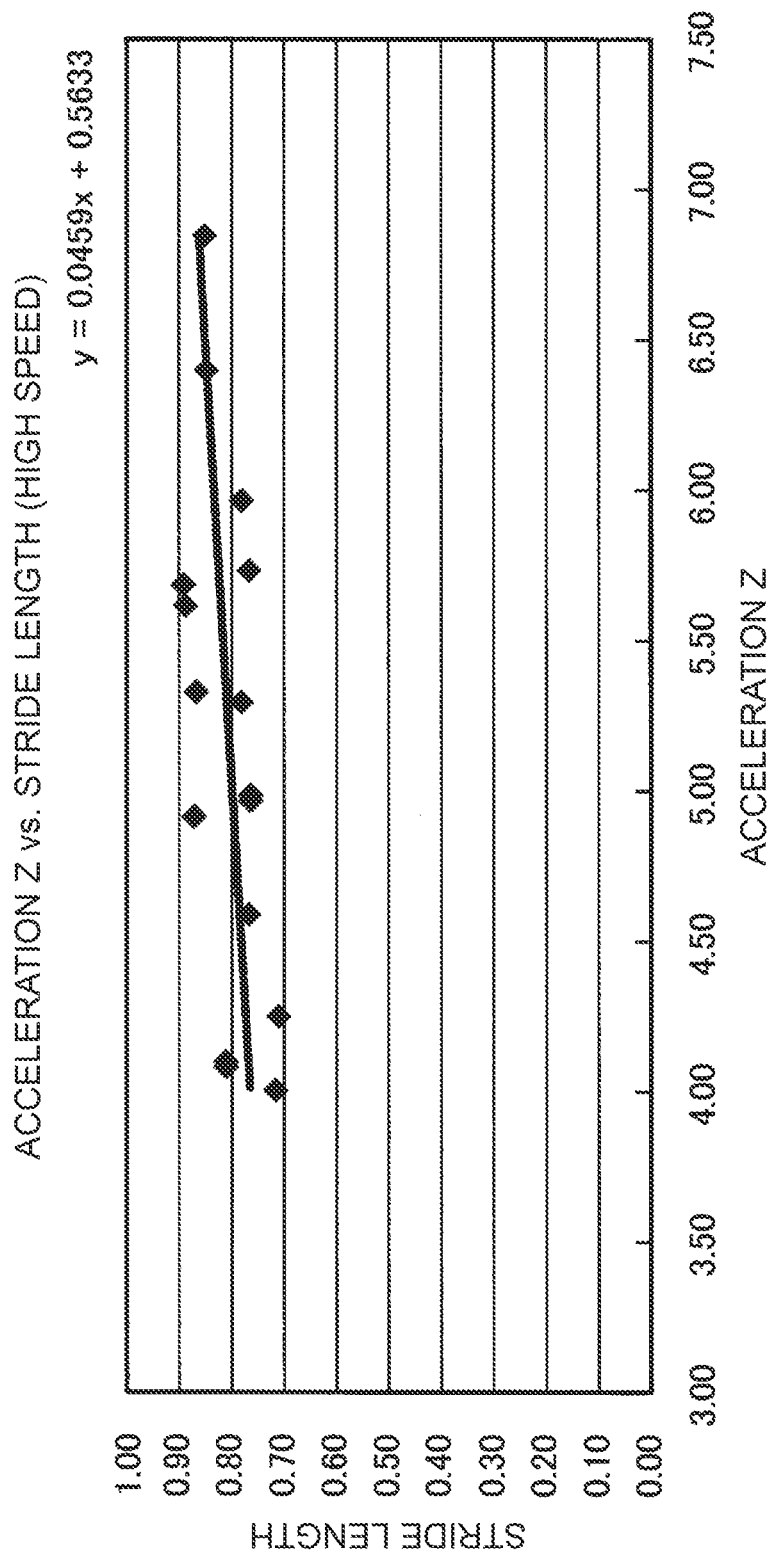
FIG. 6 is a diagram showing an example of the correspondence relationship between the acceleration and the stride length.

FIGS. 4 to 6 are diagrams illustrating the correlation between the acceleration along the Z axis and stride length. Experiments were performed in which the user's walking speed was classified into three walking speed ranges of "low speed", "intermediate speed", and "high speed", and the relationship between the acceleration along the Z axis after the filter processing and the stride length for each walking speed range was checked. FIG. 4 is an experiment result in a case where the walking speed range was the "low speed". In addition, FIG. 5 is an experiment result in a case where the walking speed range was the "intermediate speed". FIG. 6 is an experiment result in a case where the walking speed range was the "high speed". One mark represents one experiment result.

From these figures, it can be understood that, as the acceleration along the Z axis increases, the stride length increases, for any of the walking speed ranges. In other words, there is positive correlation between the acceleration along the Z axis and the stride length. In this embodiment, a correlation modeling equation has been prepared in which the correlation between the acceleration in the Z-axis and the stride length is approximated by a linear function, and the user's stride length is estimated based on the correlation modeling equation.

From FIGS. 4 to 6, it can be understood that, as the walking speed range approaches from the low speed to the high speed, the rate of change in the stride length with respect to change in the acceleration along the Z axis decreases, and thus, when the correlation modeling equation is a linear function, the slope decreases. In other words, it can be understood that the degree of the correlation between the acceleration along the Z axis and the stride length changes in accordance with the user's walking speed. Thus, in this embodiment, another correlation modeling equation according to the user's walking speed range has been prepared, and the stride length is estimated based on the correlation modeling equation corresponding to the determined user's speed.

2-3. Principle of Estimating Walking Direction

Next, the principle of estimating the walking direction will be described. In this embodiment, the user's walking direction is estimated based on the angular velocity of the axial rotation in the vertical direction (the Z axis) that is detected by the gyro sensor 43. In other words, since the Z axis corresponds to a yaw axis, the walking direction is estimated based on the angular velocity of the axial rotation of the yaw axis.

More specifically, by performing filter processing for the angular velocity detected by the gyro sensor 43, similarly to the case of the detection result of the acceleration sensor 41, the angular velocity is smoothed. Then, by performing an integral process for the smoothed angular velocity of the axial rotation of the yaw axis, the user's movement direction is estimated. In other words, the angular velocity of the axial rotation of the yaw axis is integrated for the time needed for one step that is determined in the detecting of the number of steps, and thereby the amount of change in the user's walking direction for the time is calculated. Then by adding the calculated amount of change in the walking direction to the previous walking direction (latest walking direction), the present walking direction of the user is estimated.

Regarding the filter processing for the angular velocity, similarly to the case of the above-described detecting of the number of steps, the filter processing is performed while the threshold frequency is set to be changed in accordance with the user's speed. Although not shown in the figure, as a result of the experiment, it could be understood that the temporal change in the angular velocity of the Z-axial rotation tends to be almost the same as the temporal change in the acceleration along the Z axis. In other words, as the user's speed increases, the more high-frequency components tend to be included in the angular velocity of the Z-axis rotation as noise. Based on this result, as the user's speed increases, the filter processing for the angular velocity is performed with the threshold frequency set to be higher.

In addition, the error in the angular velocity detected by the gyro sensor 43 tends to increase in accordance with the temporal change. In other words, since the detection error gradually increases in accordance with an elapse of time from the start of the detection, error in the walking direction acquired by an integral process also tends to be accumulated. Thus, in this embodiment, from the temporal change in the walking direction that is acquired by the integral process, a process is performed in which change in the angle that is equal to or less than a predetermined angle (for example, three degrees) is eliminated. In other words, a correction process for enforcedly correcting the amount of change in the walking direction that is equal to or less than a predetermined angle to "zero" is performed, and the corrected walking direction is assumed to be the user's walking direction.

3. Functional Configuration

Figure 7:
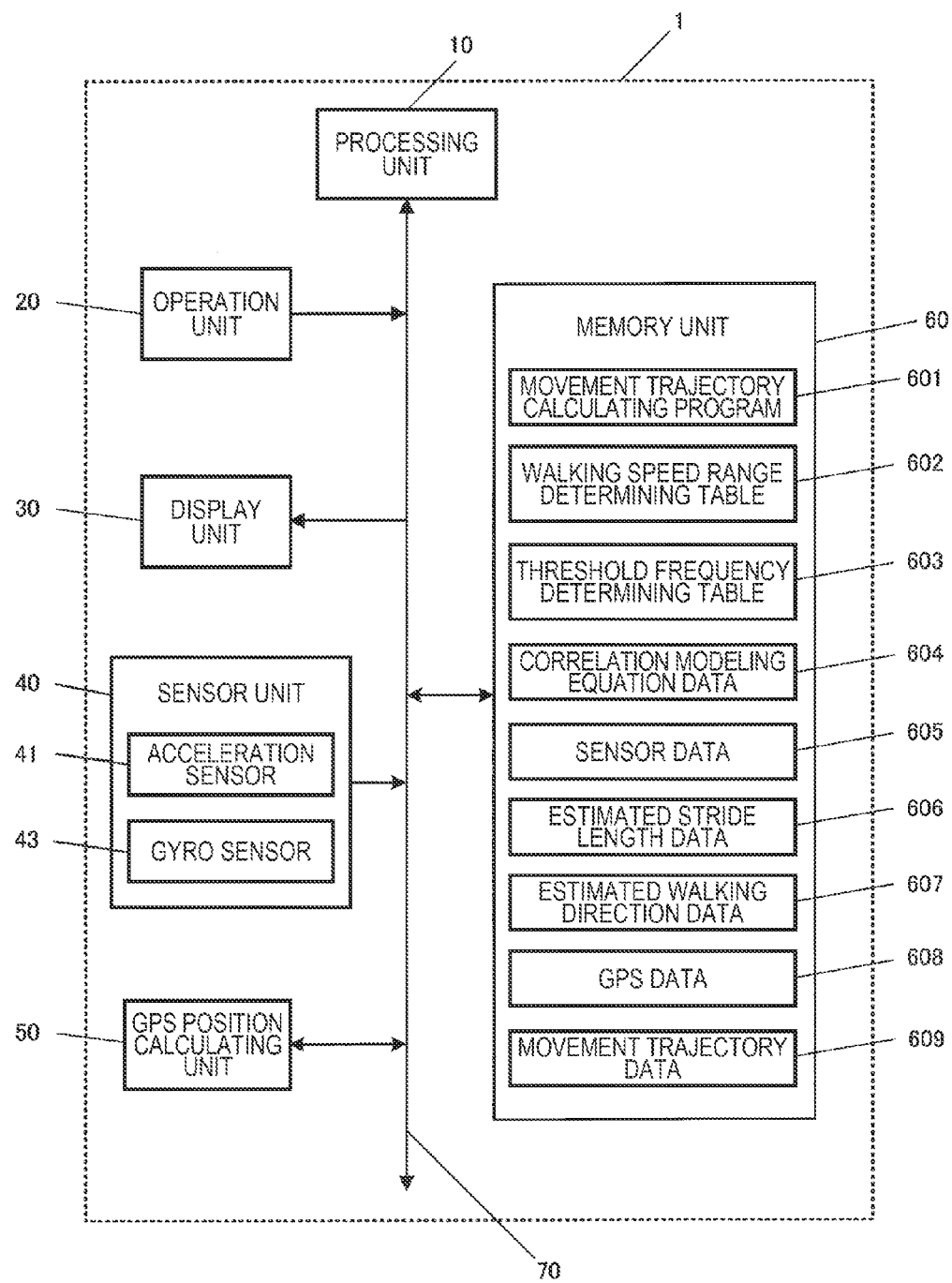
FIG. 7 is a block diagram showing the functional configuration of the navigation apparatus.

FIG. 7 is a block diagram showing the functional configuration of the navigation apparatus 1. The navigation apparatus 1 is a computer system including a processing unit 10, an operation unit 20, a display unit 30, a sensor unit 40, a GPS position calculating unit 50, and a memory unit 60, and the units are connected through a bus 70.

The processing unit 10 is a functional unit that controls the units of the navigation apparatus 1 in a unified manner in accordance with various programs such as a system program and the like that are stored in the memory unit 60 and, for example, is realized by a processor such as a CPU (Central Processing Unit). In this embodiment, the processing unit 10 calculates a user's movement trajectory in accordance with a movement trajectory calculating program 601 stored in the memory unit 60 and displays the movement trajectory on the display unit 30.

The operation unit 20 is an input device that is, for example, configured by a touch panel, button switches, or the like and outputs a signal corresponding to a key or a button that is pressed to the processing unit 10. By the operation of the operation unit 20, various instruction inputs such as an instruction operation for starting to calculate the movement trajectory, a reset instruction operation, or a power-off instruction operation are made.

The display unit 30 is configured by an LCD (Liquid Crystal Display) or the like and is a display device that performs various displays based on the display signal input from the processing unit 10. On the display unit 30, a movement trajectory, time information, or the like is displayed.

The sensor unit 40 is a functional unit that has a sensor used for detecting the user's walking state and is, for example, configured by an acceleration sensor 41 and a gyro sensor 43. The detection results of the acceleration sensor 41 and the gyro sensor 43 are output to the processing unit 10 as needed.

The GPS position calculating unit 50 is a position calculating circuit that calculates a position, movement speed, and a movement direction of a user at a predetermined time interval (for example, once every 30 seconds) by using GPS satellite signals transmitted from GPS satellites that are one type of position measuring satellite. The GPS position calculating unit 50 calculates the user's position by using a known position calculating method using a pseudo distance between the navigation apparatus 1 and the GPS satellite. In addition, the GPS position calculating unit 50 calculates the movement speed and the movement direction of the user by using a known movement speed and movement direction calculating method using temporal change in the Doppler frequency according to the movement of the navigation apparatus 1 and the GPS satellites.

The memory unit 60 is a memory device having a memory such as a ROM (Read Only Memory), a flash ROM, or a RAM (Random Access Memory). The memory unit 60 stores a system program used by the processing unit 10 for controlling the navigation apparatus 1, various programs and data used for implementing the movement trajectory calculating function, and the like therein. In addition, the memory unit 60 forms a work area in which the system program executed by the processing unit 10, various processing programs, data in the middle of various processes, process results, and the like are temporarily stored.

Figure 8:
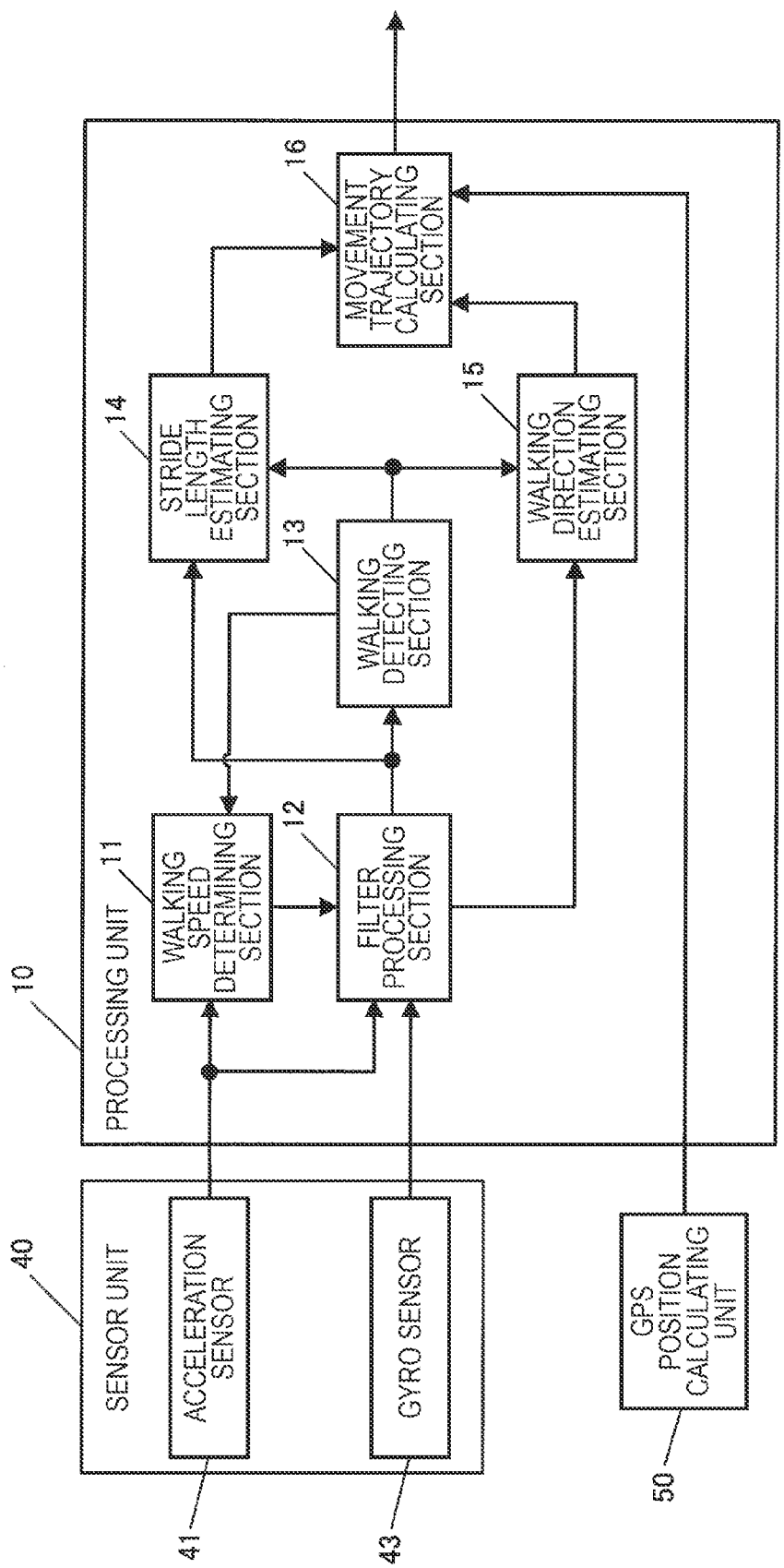
FIG. 8 is a block diagram representing a processing unit as functional blocks.

FIG. 8 is a conceptual diagram in which the processing unit 10 is represented as functional blocks. The processing unit 10 includes a walking speed determining section 11, a filter processing section 12, a walking detecting section 13, a stride length estimating section 14, a walking direction estimating section 15, and a movement trajectory calculating section 16. Each functional unit may be configured as an independent circuit or configured as software processing by performing a digital calculation process using a processor.

The walking speed determining section 11 is a functional unit that determines a user's walking speed range based on the amplitude of acceleration along the Z axis, which is detected by the acceleration sensor 41, and the time needed for one step, which is detected by the walking detecting section 13, and outputs the determined walking speed range to the filter processing section 12.

The filter processing section 12 is a functional unit that extracts a low-frequency component by performing filter processing for the acceleration and the angular velocity detected by the acceleration sensor 41 and the gyro sensor 43. The filter processing section 12 performs the filter processing with the threshold frequency being set variably in accordance with the walking speed range that is output from the walking speed determining section 11.

The walking detecting section 13 is a functional unit that detects user's walking by detecting a peak of the acceleration along the Z axis that is output from the filter processing section 12. In addition, the stride length estimating section 14 is a functional unit that estimates a stride length based on the correlation modeling equation stored in the memory unit 60 by using the acceleration along the Z axis that is output from the filter processing section 12 in a case where one step is detected by the walking detecting section 13.

The walking direction estimating section 15 is a functional unit that estimates a user's walking direction by performing an integral process for the angular velocity in the yaw direction that is output from the filter processing section 12. In addition, the movement trajectory calculating section 16 is a functional unit that calculates a user's movement trajectory by using the stride length output from the stride length estimating section 14 and the walking direction output from the walking direction estimating section 15.

4. Configuration of Data

As shown in FIG. 7, in the memory unit 60, a movement trajectory calculating program 601 that is read out by the processing unit 10 as a program and is executed as a movement trajectory calculating process (see FIG. 14) is stored. In addition, as predetermined data, a walking speed range determining table 602, a threshold frequency determining table 603, and correlation modeling equation data 604 are stored therein. Furthermore, as data updated as is needed, sensor data 605, estimated stride length data 606, estimated walking direction data 607, GPS data 608, and movement trajectory data 609 are stored therein.

The movement trajectory calculating process is a process performed by the processing unit 10 for calculating a user's movement trajectory using an estimated stride length and an estimated walking direction by performing walking detecting and stride length estimating based on the detection result of the acceleration sensor 41 and estimating a movement direction based on the detection result of the gyro sensor 43. The movement trajectory calculating process will be described later in detail with reference to a flowchart.

Figure 9:
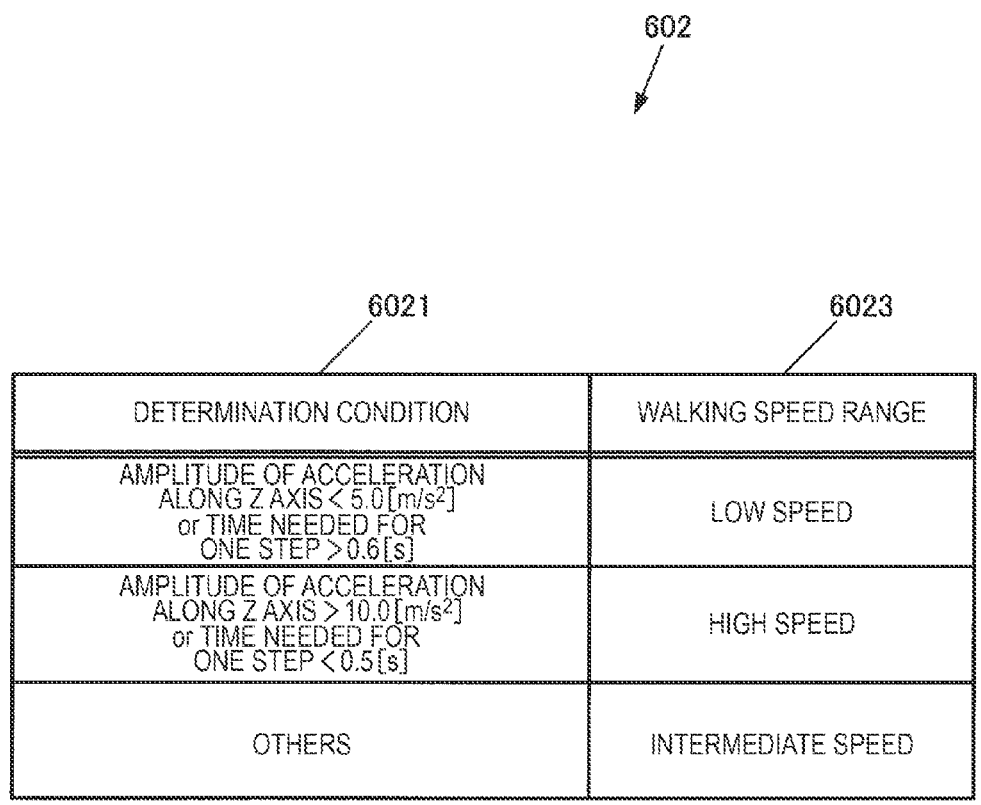
FIG. 9 is a diagram showing an example of the table configuration of a walking speed range determining table.

FIG. 9 is a diagram showing an example of the table configuration of the walking speed range determining table 602. The walking speed range determining table 602 is a table that is used for determining a walking speed range representing the level of user's walking speed. In the walking speed range determining table 602, determination conditions 6021 used for determining a walking speed range and walking speed ranges 6023 classified into three levels of "low speed", "intermediate speed", and "high speed" are stored in association with each other.

More specifically, for a determination condition 6021 of "the amplitude of the acceleration along the Z axis is less than 5.0 [m/s$^2$], and time needed for one step is longer than 0.6 second", "low speed" is stored as the walking speed range 6023. The reason for this is that, as the user's walking speed decreases, the amplitude of the acceleration along the Z axis decreases, and the time needed for one step tends to be lengthened.

In addition, for a determination condition 6021 of "the amplitude of the acceleration along the Z axis is greater than 10.0 [m/s$^2$], and time needed for one step is shorter than 0.5 second", "high speed" is stored as the walking speed range 6023. The reason for this is that, as the user's walking speed increases, the amplitude of the acceleration along the Z axis increases, and the time needed for one step tends to be shortened.

In addition, for "others" that is a determination condition 6021 in a case where any of the above-described two determination conditions is not satisfied, "intermediate speed" is stored as a walking speed range 6023.

Figure 10:
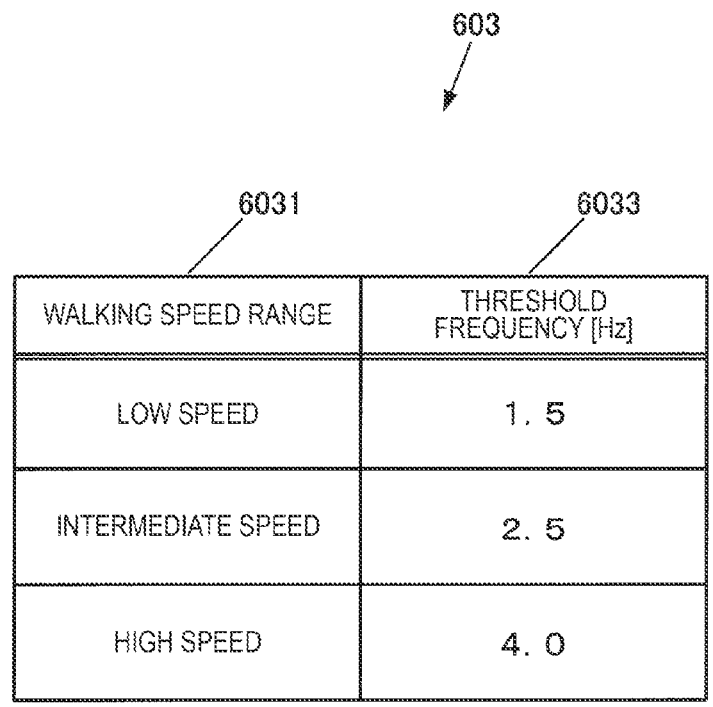
FIG. 10 is a diagram showing an example of the table configuration of a threshold frequency determining table.

FIG. 10 is a diagram showing an example of the table configuration of the threshold frequency determining table 603. The threshold frequency determining table 603 is a table that is used for determining a threshold frequency when filter processing for the acceleration and the angular velocity is performed. In the threshold frequency determining table 603, a walking speed range 6031 and a threshold frequency 6033 are stored in association with each other. As the walking speed range 6031 becomes high speed from low speed, a higher threshold frequency 6033 is set.

More specifically, for the walking speed range 6031 of "low speed", 1.5 [Hz] is stored as the threshold frequency. In addition, for the walking speed range 6031 of "intermediate speed", 2.5 [Hz] is stored as the threshold frequency. For the walking speed range 6031 of "high speed", 4.0 [Hz] is stored as the threshold frequency.

FIG. 11 is a diagram showing an example of the data configuration of the correlation modeling equation data 604. The correlation modeling equation data 604 is data in which a correlation modeling equation used for estimating a user's stride length is determined. In the correlation modeling equation data 604, a walking speed range 6041 and a stride length estimating modeling equation 6043 are stored in association with each other.

For each walking speed range 6041, a stride length estimating modeling equation 6043 that is approximated as a linear function with acceleration "x" along the Z axis set as a variable, and a stride length "y" set as a function value is stored with one-to-one correspondence. The slope and the value of an intercept of the stride length estimating modeling equation 6043 are determined to have different values in accordance with the walking speed range 6041. In other words, as the walking speed range becomes closer to the high speed, a small value is set as the slope of the linear function so as to decrease the rate of change in the stride length with respect to change in the acceleration along the Z axis. However, the linear function as a function approximating the stride length estimating modeling equation is an example. Thus, the stride length estimating modeling equation may be approximated as a function of the second or higher order.

FIG. 12 is a diagram showing an example of the data configuration of the sensor data 605. The sensor data 605 is data of the detection result of the sensor unit 40. In the sensor data 605, detection time 6051 (for example, in units of milliseconds) of the sensor unit 40, acceleration 6023 of three axes detected by the acceleration sensor 41, and angular velocity 6025 of axial rotation of three axes detected by the gyro sensor 43 are stored in association with one another.

The estimated stride length data 606 is data of a user's stride length that is estimated based on the stride length estimating modeling equation 6043. The estimated walking direction data 607 is data of the user's walking direction that is estimated based on the detection result of the gyro sensor 43. In addition, the GPS data 608 is data in which an absolute position, movement speed, and the movement direction calculated by the GPS position calculating unit 50 are stored in association with the calculated time. The GPS data 608 is data that is updated when data is output from the GPS position calculating unit 50 at a predetermined time interval.

FIG. 13 is a diagram showing an example of the data configuration of the movement trajectory data 609. The movement trajectory data 609 is data of a user's movement trajectory. In the movement trajectory data 609, calculated result output time 6091, a calculated position 6093, walking speed 6095, a walking direction 6097, and a relative/absolute type 6099 are stored in association with one another.

The relative/absolute type 6099 is a type that indicates whether the calculation results of the position 6093, the walking speed 6095, and the walking direction 6097 are relative calculation results or absolute calculation results. For a calculation result that is relatively calculated with respect to the previous calculation result as a reference, "relative" is stored therein, and for a calculation result that is absolutely calculated by the GPS position calculating unit 50, "absolute" is stored therein. When the absolute calculation result is output from the GPS position calculating unit 50, the movement trajectory data 609 is reset.

5. Flow of Processing

Figure 14:
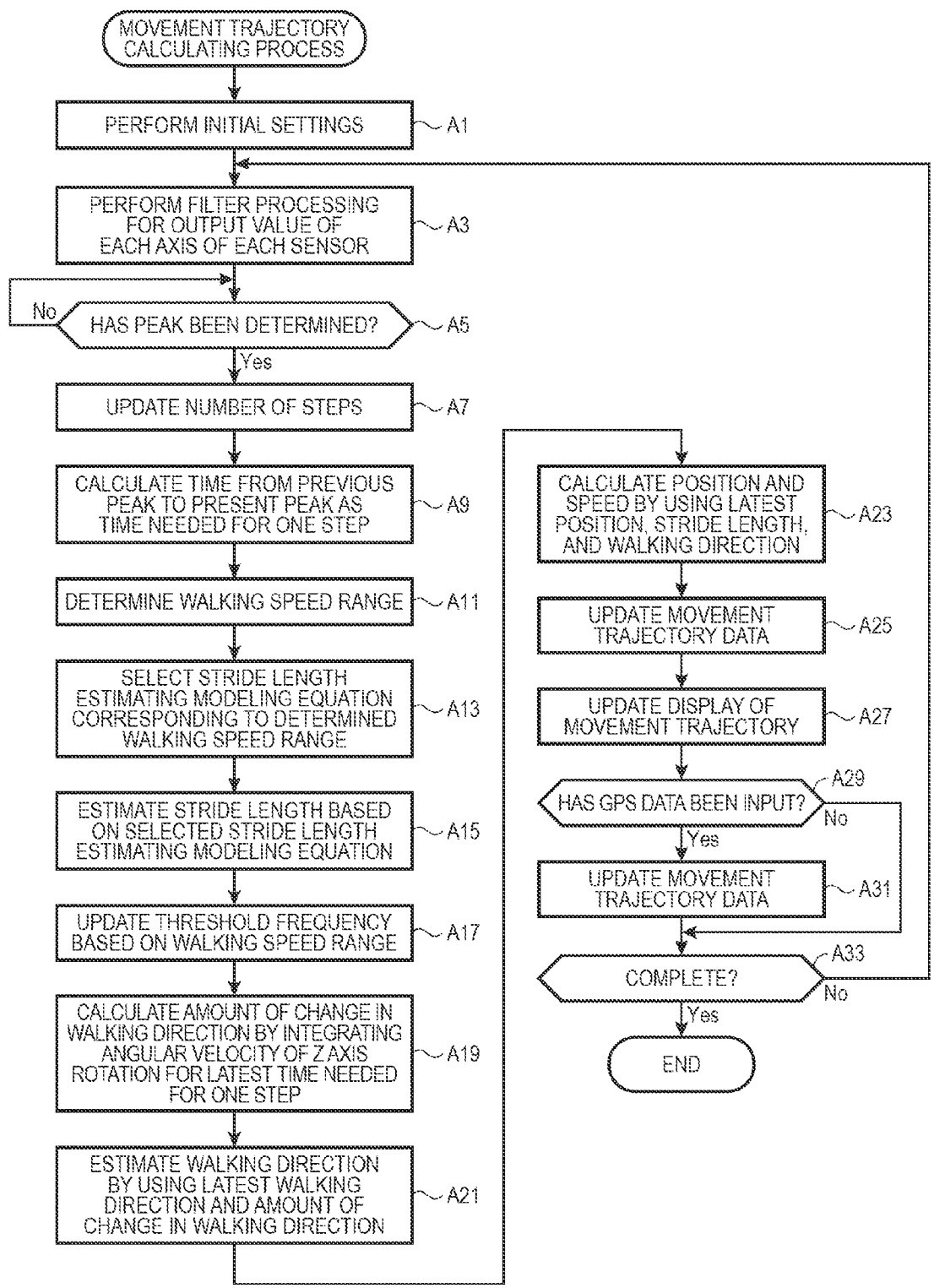
FIG. 14 is a flowchart showing the flow of a movement trajectory calculating process.

FIG. 14 is a flowchart showing the flow of the movement trajectory calculating process that is performed by the navigation apparatus 1 by reading out and executing the movement trajectory calculating program 601 stored in the memory unit 60 using the processing unit 10. The movement trajectory calculating process is a process that is started when the processing unit 10 detects a user's power-on operation through the operation unit 20. In the movement trajectory calculating process described below, it is assumed that the detection result of the sensor unit 40 is updated and stored as needed as sensor data 605 of the memory unit 60.

First, the processing unit 10 performs initial settings (Step A1). More specifically, a predetermined value (for example, 1.5 Hz) is set as the threshold frequency of the filter processing, and initial values of various types of data of the memory unit 60 are set. Then, the filter processing section 12 performs filter processing for the output values of each axis of the acceleration sensor 41 and the gyro sensor 43 using the threshold frequency that is currently set (Step A3).

Next, the walking detecting section 13 determines whether or not a peak is detected based on the acceleration along the Z axis after the filter processing (Step A5), and waits until a peak is detected (Step A5; No). Then, when a peak is detected (Step A5; Yes), one step is determined, and the number of steps is updated (Step A7). Then, the walking detecting section 13 calculates time from the previous peak to the present peak as the time needed for one step (Step A9).

Next, the walking speed determining section 11 determines a user's walking speed range by referring to the walking speed range determining table 602 that is stored in the memory unit 60 (Step A11). More specifically, it is determined which determination condition 6021 is satisfied by using the amplitude of the acceleration along the Z axis that is detected by the acceleration sensor 41 and the time needed for one step that is calculated in Step A9. Then, the walking speed range 6023 corresponding to the determined determination condition 6021 is read out.

Next, the stride length estimating section 14 selects stride length estimating modeling equation data 6043 that is associated with the walking speed range 6041 determined in Step A11 by referring to the correlation modeling equation data 604 that is stored in the memory unit 60 (Step A13). Then, the stride length estimating section 14 estimates a user's stride length in accordance with the selected stride length estimating modeling equation 6043 and updates the estimated stride length data 606 stored in the memory unit 60 (Step A15).

Thereafter, the filter processing section 12 reads out a threshold frequency 6033 corresponding to the walking speed range 6031 determined in Step A11 by referring to the threshold frequency determining table 603 that is stored in the memory unit 60 and updates the threshold frequency (Step A17).

Then, the walking direction estimating section 15 calculates the amount of change in the user's walking direction by integrating the angular velocity along the Z axis rotation for which the filter processing has been performed for the time needed for one step that is calculated in Step A9 (Step A19). Then, the walking direction estimating section 15 estimates a user's walking direction using the latest walking direction 6097 stored in the movement trajectory data 609 of the memory unit 60 and the calculated amount of change in the walking direction and updates the estimated walking direction data 607 of the memory unit 60 (Step A21).

Next, the movement trajectory calculating section 16 calculates the current position and the current speed of the user using the latest position stored in the movement trajectory data 609, the stride length stored in the estimated stride length data 606, and the walking direction stored in the estimated walking direction data 607 (Step A23). Then, the movement trajectory calculating section 16 updates the movement trajectory data 609 of the memory unit 60 with the position and the speed that have been calculated and the walking direction calculated in Step A21 (Step A25). In addition, the movement trajectory calculating section 16 updates the display of the movement trajectory of the display unit 30 (Step A27).

Thereafter, the movement trajectory calculating section 16 determines whether or not the GPS data 608 has been input from the GPS position calculating unit 50 (Step A29). When the GPS data 608 is determined to have been input (Step A29; Yes), the movement trajectory data 609 of the memory unit 60 is updated with the position, the speed, and the movement direction included in the input GPS data 608 (Step A31). On the other hand, when the GPS data 608 is determined not to have been input (Step A29; No), the process proceeds to Step A33.

Next, the movement trajectory calculating section 16 determines whether or not calculation of the movement trajectory is completed (Step A33). In other words, the movement trajectory calculating section 16 determines whether or not an instruction operation for completing calculation of the movement trajectory is made through the operation unit 20. When the calculation of the movement trajectory is determined not to be completed (Step A33; No), the process is returned to Step A3. On the other hand, when the calculation of the movement trajectory is determined to be completed (Step A33; Yes), the movement trajectory calculating process is completed.

6. Operations and Advantages

In the navigation apparatus 1, filter processing is performed by the filter processing section 12 for the detection result of the acceleration sensor 41. Then, a peak of the acceleration along the Z axis after the filter processing is detected by the walking detecting section 13, whereby user's walking is detected. Then, when walking is detected by the walking detecting section 13, a user's stride length is estimated by the stride length estimating section 14 based on the stride length estimating modeling equation that is determined in advance in correspondence with the user's walking speed by using the acceleration along the Z axis for which the filter processing has been performed.

Meanwhile, the filter processing section 12 performs filter processing also for the detection result of the gyro sensor 43. Then, a user's walking direction is estimated by the walking direction estimating section 15 by performing an integral process for the angular velocity of the Z axis rotation for which the filter processing has been performed. Then, a user's movement trajectory is calculated by the movement trajectory calculating section 16 using the stride length estimated by the stride length estimating section 14 and the walking direction estimated by the walking direction estimating section 15.

As described as the principle, there is positive correlation between the acceleration of user's vertical movement (Z axis) and the user's stride length. In addition, the rate of change in the stride length with respect to change in the acceleration changes in accordance with the user's speed. Accordingly, by estimating the user's stride length by changing the degree of correlation between the acceleration of the vertical movement and the stride length in accordance with the user's walking speed, a user's stride length can be estimated more accurately.

In this embodiment, correlation between the acceleration of user's vertical movement and the stride length is determined in advance for each walking speed range of a user as a correlation modeling equation. The correlation modeling equation is a modeling equation that is approximated as a linear function in which the acceleration of vertical movement is set as a variable, and the stride length is set as a function value. As the walking speed range becomes closer to high speed, a smaller value is set as the slope of the correlation modeling equation. By using a simple correlation modeling equation of a linear function, the stride length can be estimated simply and easily, and by setting parameters of the correlation modeling equation in accordance with the user's walking speed, a stride length can be appropriately estimated.

7. Modified Examples 7-1. Electronic Apparatus

An embodiment of the invention can be also applied to any electronic apparatus including a stride length estimating device other than the navigation apparatus. For example, an embodiment of the invention can be similarly applied to a pedometer, a wrist watch, and the like.

7-2. Calibration of Sensor Unit

It may be configured that a calibration process (a correction process of sensors) for the sensor unit 40 is performed at a predetermined timing, and estimation of a stride length and estimation of a walking direction are performed based on the detection result of the calibrated sensor unit 40. The calibration can be realized by calculating the value of an error parameter such as a zero-sum bias or a scaling factor of the sensor.

As a timing for performing the calibration process, for example, a timing when the power is turned on, a timing when a predetermined time interval elapses, a timing when a user's instruction operation for calibration is made, a timing when a change in the temperature occurs to some degree or higher, or the like can be used. By using the detection result of the calibrated sensor unit 40, the accuracy in estimation of the stride length and estimation of the walking direction can be further improved.

7-3. Threshold Frequency of Filter Processing

In the above-described embodiment, a common threshold frequency has been described to be set for the acceleration filter processing and the angular velocity filter processing. However, a threshold frequency for the acceleration filter processing and a threshold frequency for the angular velocity filter processing may be individually set. In such a case, it may be configured that the threshold frequency determining table 603 shown in FIG. 10 is stored in the memory unit 60 by being divided into two types for the acceleration filter processing and the angular velocity filter processing, and the threshold frequencies are set in accordance with the two types of the tables.

7-4. Determination of Walking Speed Range

In the above-described embodiment, the walking speed determining section 11 has been described to determine a user's walking speed range based on the amplitude of the acceleration along the Z axis that is detected by the acceleration sensor 41 and the time needed for one step that is detected by the walking detecting section 13. However, the walking speed range may be determined by directly calculating the speed.

More specifically, the walking speed determining section 11 integrates the acceleration for the time needed for one step that is detected by the acceleration sensor 41 and calculates the amount of change in the speed for the time needed for the step. Then, by adding the calculated amount of change in the speed to the previous walking speed (latest walking speed), the present walking speed of the user is calculated. In accordance with the user's walking speed, the user's walking speed range is classified into three levels of "low speed", "intermediate speed", and "high speed".

7-5. Estimation of Stride Length

In the above-described embodiment, a user's stride length is described to be estimated based on the correlation modeling equation that represents the correlation between the acceleration along the Z axis and the stride length. However, a stride length may be estimated based on tables corresponding to the user's walking speed range by preparing the tables used for determining the correspondence relationship between the acceleration along the Z axis and the stride length for each walking speed range.

The entire disclosure of Japanese Patent Application No. 2010-008809, filed on Jan. 19, 2010 is expressly incorporated by reference herein.

What is claimed is:

1. A method of estimating a stride length, using a navigation apparatus having an acceleration sensor, the method comprising:
    detecting amplitude of acceleration of a user's vertical movement; using the acceleration sensor; and
    estimating a stride length using the detected amplitude of acceleration by changing the degree of correlation between the amplitude of acceleration and the stride length, in which the stride length is increased as the detected amplitude of acceleration increases; wherein the degree of correlation is changed such that, as user's speed increases, a rate of change in the stride length with respect to change in the amplitude of acceleration decreases.

2. A method of calculating a movement trajectory, the method comprising:
    estimating a user's stride length by using the method according to claim 1;
    estimating a user's walking direction by using a gyro sensor; and
    calculating a user's movement trajectory by using the estimated stride length and the estimated walking direction.

3. The method according to claim 2, wherein the estimating of a walking direction includes:
    extracting a low frequency component from a detection result of the gyro sensor;
    changing a frequency band to be extracted in accordance with user's speed; and
    estimating the walking direction using a detection result of the extracted low frequency component of the gyro sensor.

4. The method according to claim 1, wherein the estimating of a stride length is estimating a stride length by using a correlation modeling equation between the acceleration and the stride length using the degree of the correlation.

5. The method according to Claim 1, wherein a frequency band to be extracted is changed in accordance with the user's speed.

6. A stride length estimating device comprising:
    an acceleration detecting unit that detects amplitude of acceleration of a user's vertical movement; and
    a stride length estimating unit that estimates a stride length using the detected amplitude of acceleration by changing the degree of correlation between the acceleration and the stride length, in which, as the acceleration detected by the acceleration detecting unit increases, the stride length is increased, wherein the degree of correlation is changed such that, as user's speed increases, a rate of change in the stride length with respect to change in the amplitude of acceleration decreases.

* * * * *